No. 763,409. PATENTED JUNE 28, 1904.
E. A. LIND.
SELF OILING LOOSE PULLEY HUB AND BUSHING.
APPLICATION FILED APR. 5, 1904.
NO MODEL.
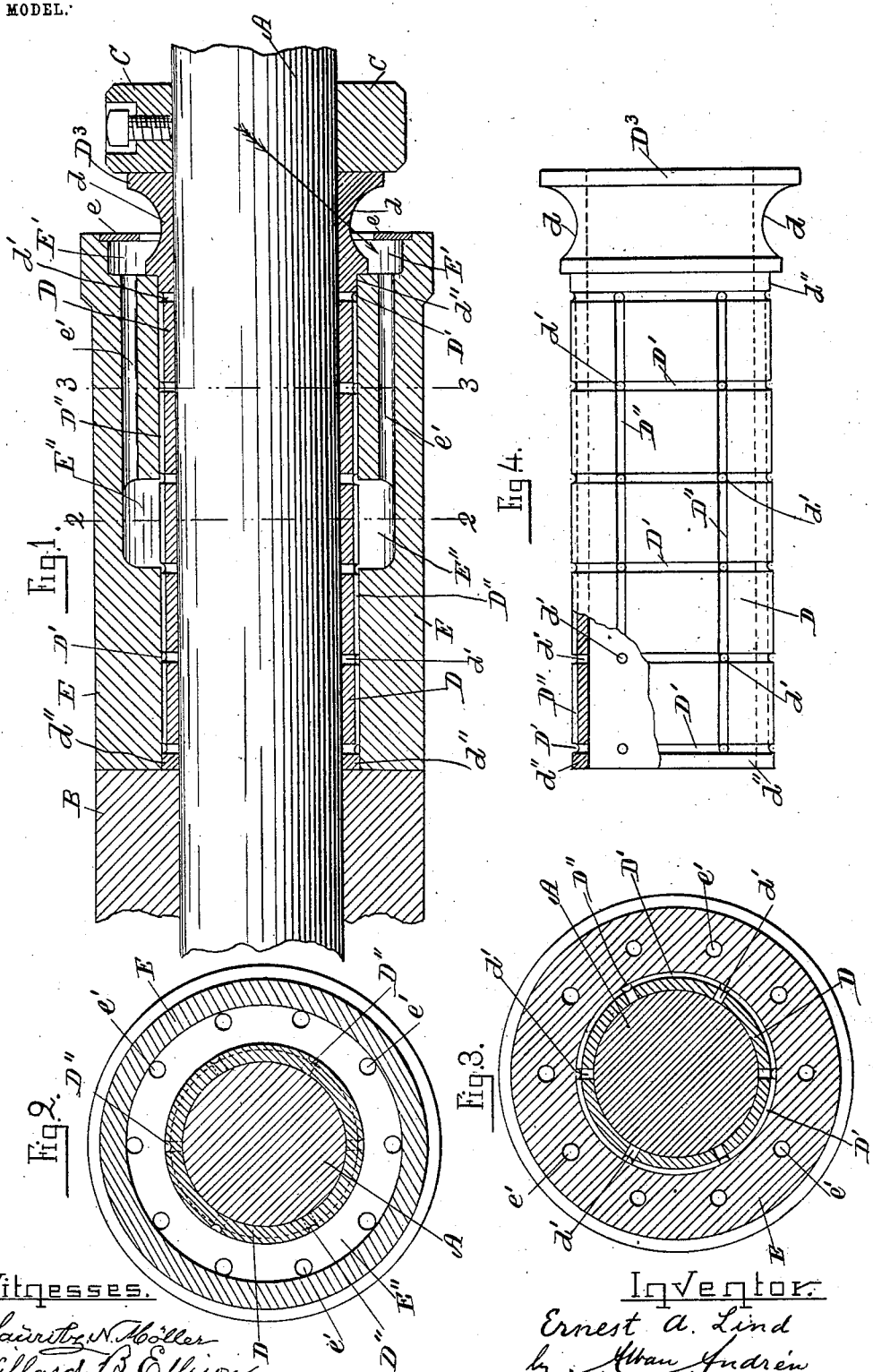

No. 763,409.

Patented June 28, 1904.

UNITED STATES PATENT OFFICE.

ERNEST A. LIND, OF LAWRENCE, MASSACHUSETTS.

SELF-OILING LOOSE-PULLEY HUB AND BUSHING.

SPECIFICATION forming part of Letters Patent No. 763,409, dated June 28, 1904.

Application filed April 5, 1904. Serial No. 201,646. (No model.)

*To all whom it may concern:*

Be it known that I, ERNEST A. LIND, a citizen of the United States, and a resident of Lawrence, in the county of Essex and State of Massachusetts, have invented certain new and useful Improvements in Self-Oiling Loose-Pulley Hubs and Bushings, of which the following is a specification.

This invention relates to an improved self-oiling loose-pulley hub and bushing; and it has for its object means for effectually lubricating not alone the bushing where it is journaled on the shaft, but also the hub of a loose pulley where it is journaled upon said bushing, as will hereinafter be more fully shown and described, reference being had to the accompanying drawings, wherein—

Figure 1 is a central longitudinal section of my improved self-oiling loose-pulley hub and bushing. Fig. 2 is a cross-section on the line 2 2 shown in Fig. 1. Fig. 3 is a cross-section on the line 3 3 shown in Fig. 1; and Fig. 4 is a side elevation of the loose bushing, showing a portion thereof in section.

Similar letters refer to similar parts wherever they occur on the different parts of the drawings.

In the drawings, A represents a rotary shaft on which is secured in a suitable manner a fast pulley B, as shown in Fig. 1. On said shaft is secured a collar C, between which and the fast-pulley hub B is located a metal bushing D, loosely journaled on the shaft A, as shown.

E is a pulley-hub loosely journaled on the bushing D, which hub may be made integral with the loose pulley or attached to it in any suitable manner, or, if so desired, a split pulley may be secured to said pulley-hub.

In one end of the loose-pulley hub E is an annular recess $E'$, the outer end of which is partially covered by a rim $e$, as shown in Fig. 1.

On the interior of the hub E is made an annular lubricant-chamber $E''$, which is in open communication with the exterior of the bushing D, and the said chamber is connected with the recess $E'$ by means of a series of longitudinal perforations $e'\ e'$, going through the body of the hub E, as shown in Figs. 1, 2, and 3.

At the end of the bushing D is a head $D^3$, having an annular groove $d$, arranged about opposite to the rim $e$ on the hub E, as shown in Fig. 1.

On the exterior of the bushing D are made a series of annular grooves $D'\ D'$ and a series of longitudinal grooves $D''\ D''$, at the intersection of which are perforations $d'\ d'$, by means of which a free communication is established from the exterior of the bushing to the interior thereof, so as to cause the bushing to be lubricated relative to the axle on which it is journaled, as well as causing the sleeve to be lubricated relative to the interior of the loosely-rotating hub, thus insuring a perfect lubrication of the axle, bushing, and hub during the rotation of said parts.

The longitudinal grooves $D''$ on the exterior of the bushing D terminate a short distance from the ends of the latter, as shown at $d''\ d''$, so as to prevent the lubricant from escaping at such places.

The device can readily be lubricated during the rotation of the loose-pulley hub by placing the spout of an oil-can in the annular space between the rim $e$ and groove $d$, as shown by arrow in Fig. 1, causing the lubricant to drop into the recess $E'$, from which it passes through the longitudinal perforations $e'\ e'$ into the lubricant-chamber $E''$ and thence into the longitudinal and transverse grooves $D''\ D'$ on the exterior of the bushing D and from said grooves through the perforations $d'$ onto the axle A, by which the axle is lubricated relative to the bushing, as well as the latter relative to the loose-pulley hub in which it is journaled.

Having thus fully described the nature, construction, and operation of my invention, I wish to secure by Letters Patent and claim—

1. The herein-described self-oiling loose-pulley hub and bushing, comprising in combination with an axle, a perforated bushing loosely journaled thereon, there being series of longitudinal and transverse grooves in the exterior of said bushing, and a pulley-hub loosely journaled thereon, and having an annular lubricant-chamber, there being an annular recess in one end of said hub and longitudinal perforations connecting said chamber and recess substantially as and for the purpose set forth.

2. The herein-described self-oiling loose-pulley hub and bushing, comprising in combination with an axle, a perforated bushing loosely journaled thereon, there being series of longitudinal and transverse grooves in the exterior of said bushing and a grooved head, on the end of the latter, a pulley-hub loosely journaled on the bushing and having an annular lubricant-chamber and an annular recess in one end of the hub, there being longitudinal perforations connecting said chamber and recess, and a rim for partially closing the latter to enable the device to be lubricated during the rotation of the parts, substantially as described.

In testimony whereof I have affixed my signature in presence of two witnesses.

ERNEST A. LIND.

Witnesses:
 ALBAN ANDRÉN,
 JOHN J. PODOLSKE.